(12) United States Patent
Garst

(10) Patent No.: US 7,156,574 B1
(45) Date of Patent: Jan. 2, 2007

(54) FLUSH VALVE AND DRAIN SYSTEM FOR RECREATIONAL VEHICLES

(76) Inventor: Roger Garst, P.O. Box 6484, Torrance, CA (US) 90504

( * ) Notice: Subject to any disclaimer, the term of this patent is extended or adjusted under 35 U.S.C. 154(b) by 295 days.

(21) Appl. No.: 10/816,406

(22) Filed: Apr. 1, 2004

Related U.S. Application Data

(60) Provisional application No. 60/463,012, filed on Apr. 15, 2003.

(51) Int. Cl.
*E03D 1/00* (2006.01)
(52) U.S. Cl. ............... 401/323; 137/145.2; 137/181
(58) Field of Classification Search ............... 4/300, 4/321, 323; 137/239, 240, 351, 355.16, 613, 137/615, 899; 251/148, 152; 285/144.1, 285/145.1, 145.2, 147.1, 148.4, 179, 181; 134/166 R, 167 R, 169 R
See application file for complete search history.

(56) References Cited

U.S. PATENT DOCUMENTS

| | | | |
|---|---|---|---|
| 4,550,453 A | 11/1985 | Norman | |
| 5,141,017 A | 8/1992 | Trottier | |
| 5,988,221 A * | 11/1999 | Walker | 137/899 |
| 6,408,886 B1 * | 6/2002 | Milano et al. | 137/899 |
| 6,820,630 B1 * | 11/2004 | Carringer et al. | 137/1 |

* cited by examiner

*Primary Examiner*—Huyen Le
(74) *Attorney, Agent, or Firm*—Squire, Sanders & Dempsey L.L.P.

(57) ABSTRACT

A transparent drain and flush valve component combination detachably connected between a vehicle drain outlet and a disposal conduit which leads to a sewage receptacle. The apparatus includes a main body having a pair of end plates which are joined to the body by fasteners. The end plates and the body are separated by mated flanges adapted to rotate with respect to each other. An elastomeric O-ring between the flanges not only seals but accommodates rotation of transparent attachment pipes for both the vehicle and the disposal conduit. Also, a shut-off valve is included in the body which is manually operated and takes the form of a slide or gate valve which can partially or fully open or close fluid communication between the pair of attachment pipes. A pressurized water supply is selectively attached to an attachment pipe for introducing pressurized water to the vehicle plumbing system, including the holding tank for flushing and rinsing purposes.

10 Claims, 2 Drawing Sheets

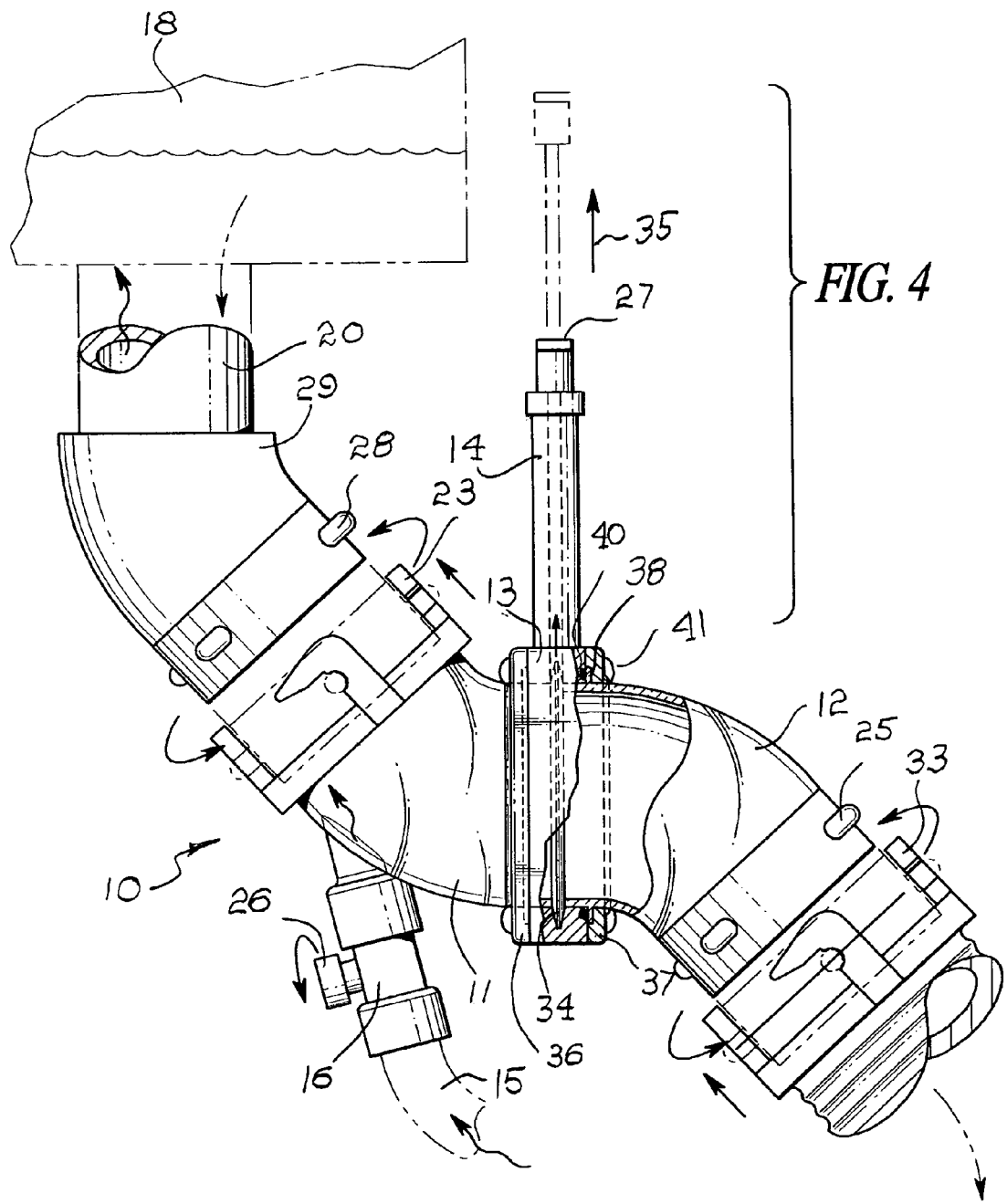

FLUSH VALVE AND DRAIN SYSTEM FOR RECREATIONAL VEHICLES

This application claims the benefit of U.S provisional application No. 60/463,012, filed on Apr. 15, 2003.

BACKGROUND OF THE INVENTION

1. Field of the Invention

The present invention relates to the field of sewage disposal systems and more particularly to a novel sewage tank clean-up valve and drain for rinsing and flushing sewage tanks carried on a vehicle, which permits ready attachment and detachment from the vehicle drainage system.

2. Brief Description of the Prior Art

In the past, it has been the conventional practice to employ a compact and portable valve and drain system that can be connected between the internal drainage plumbing on a recreational vehicle and a disposal drainage conduit, such that rinsing and cleansing of internal holding tanks of the vehicle can be easily and efficiently achieved. In conventional systems, it has been difficult to properly align, support and connect the drainage apparatus and associated valving with the plumbing outlet from the vehicle draining system to a drainage disposal conduit so that a flushing supply of water can be introduced into an empty holding tank in order to rinse and clean the tank. These difficulties stem largely from the fact that the drain and valve fittings are fixed and do not permit rotation alignment or even secure attachment to the vehicle draining outlet or to the inlet of the drainage conduit. Also, inasmuch as the drainage and flush valve components are opaque, the user can not visually observe or determine cleanliness of the flush or rinse water as the water is conducted through the components.

Therefore, a long-standing need has existed to provide transparent or see-through components in a valve and draining apparatus that may be readily attached to a drain system outlet of a vehicle holding tank, wherein attachment involves rotation of the drain and valve components which will permit positioning of the components to adequately align and connect the drainage outlet with a receiving drainage conduit.

SUMMARY OF THE INVENTION

Accordingly, the above problems and difficulties are avoided by the present invention which provides a novel transparent drain and flush valve component combination that may be readily detachably connected between a vehicle drain outlet and a disposal conduit leading to a sewage receptacle. The apparatus includes a main body having a pair of end plates which are joined to the body by means of fasteners. The end plates and the body are separated by mated flanges adapted to rotate with respect to each other. An elastomeric O-ring between the flanges not only seals but accommodates rotation of transparent attachment pipes for both the vehicle and the disposal conduit. Also, a shut-off valve is included in the body which is manually operated and takes the form of a slide or gate valve which can partially or fully open or close fluid communication between the pair of attachment pipes. A pressurized water supply is selectively attached to an attachment pipe for introducing pressurized water to the vehicle plumbing system, including the holding tank for flushing and rinsing purposes.

Therefore, it is among the primary objects of the present invention to provide a portable and compact drain assemblage having particular usage in connection with recreational vehicles for cleansing and rinsing sewage holding tanks and which assemblage can readily and efficiently attach to the vehicle plumbing system and to the sewage disposal conduit.

Another object of the invention is to provide a novel compact, portable drain apparatus for emptying and cleaning a recreational vehicle holding tank.

Still another object of the present invention is to provide a flush valve and drain assemblage for recreational vehicles having rotatable connection for readily aligning the components of the assemblage between vehicle plumbing and a sewage disposal conduit.

Another object of the present invention is to provide a flush valve and drain assemblage having components which are composed of a transparent or translucent material so that the cleansing and rinsing fluid within the assemblage can be visually observed and evaluated for cleanliness and density during a cleaning procedure.

A further object resides in a flush valve and drain assemblage having a clear 45-degree pipe which rotates a complete 360 degrees independently around the valve blade body thus enabling the valve to operate from any position and wherein rotation of the barrel allows greater flexibility for the user with the various tightly configured holding tank drain valves and plumbing.

Yet another object resides in a valve and drain assemblage having at least one clear or transparent attachment pipe or barrel adapted for 360 degrees of rotation.

Another object resides in such an assemblage incorporating at least one transparent 45-degree pipe or joint rotatably and sealably affixed to a valve body whereby the pipe or joint rotates 360 degrees about the valve body.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 4 is a side elevational view, partly in section, illustrating an operational hook-up of the flush valve and drain assemblage as installed.

DESCRIPTION OF PREFERRED EMBODIMENT

Figure 1:
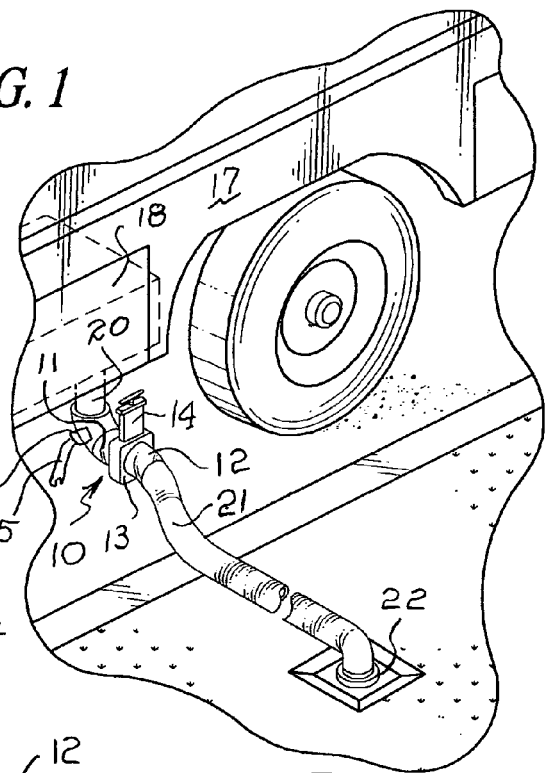
FIG. 1 is a front perspective view illustrating the flush valve and drain assemblage incorporating the present invention and illustrated interconnecting the internal plumbing of a vehicle with a sewage disposal conduit.

The flush valve and drain assemblage is illustrated in the general direction of arrow 10 in FIG. 1 which includes a first joint or inlet pipe component 11 and a second joint or outlet pipe component 12 which are rotatably mounted on opposite sides of a body 13. A shut-off valve, which is manually operated, is indicated by numeral 14. A source of pressurized fluid, such as water, is introduced to the assemblage via a hose 15 which is connected to the first inlet pipe component 11 via a valve 16. The inlet and outlet pipes are clear or transparent 45-degree barrels that have the ability to rotate 360 degrees independently of each other about the flush valve body 13.

The flush valve and drain assemblage 10 is interconnected between the plumbing of a recreational vehicle 17 which includes a holding tank 18, illustrated in broken lines, and an outlet 20 to which the first pipe component 11 is detachably connected. The second pipe component 12 is detachably coupled to a disposal conduit 21 which leads to a sewage system through drain 22.

Therefore, it can be seen that after connecting the assemblage 10 between the vehicle outlet 20 and the disposal conduit 21, the valve 14 may be manually closed and with opening of valve 16, the pressurized fluid enters the holding tank 18 for cleansing and rinsing. When it is time to discharge the rinse water, the valve 14 is opened and by gravity discharge, the holding tank 18 is emptied. A feature of the invention resides in providing the pipe components 11 and 12 with translucent or transparent material, so that the user can observe clarity of the fluid being discharged.

Figure 2:
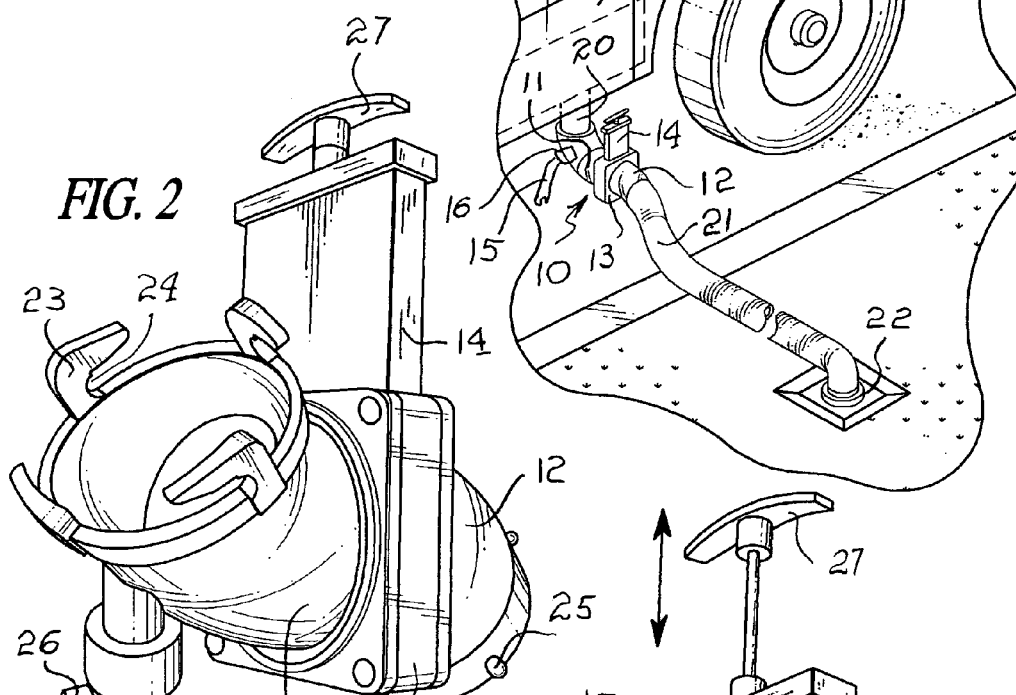
FIG. 2 is an enlarged rear view of the flush valve and drain assemblage illustrated in FIG. 1.

Referring now to FIG. 2, it can be seen that the first and second pipe components 11 and 12 are outwardly projecting from opposite sides of the body 13 and that the valve 14 separates the two pipe components. Also, it is emphasized that the material of the pipe components 11 and 12 are elbow configured and are translucent or transparent so that fluid flow through the assemblage can be visually observed. During the flush operation, pressurized water is supplied through hose 15 via a shut-off valve 16, which is manually operated, and it is then directed through the first pipe component 11 into the outlet 20 of the vehicle plumbing system. The exposed end of first pipe component 11 includes at least four (4) connector elements, such as element 23, which insertably interconnects with pins 28, see FIG. 4, on the end of the outlet 20. The elements 23 are hook-like and each element has a receptacle 24 for insertably receiving a pin carried on the outlet 20. By including four (4) elements, a stable connection is insured to prevent leakage and to provide a firm connection. Therefore, the pipe component 11 is detachably connectable with the outlet 20.

The second pipe component 12 includes at least four (4) knobs 25 for interconnecting with hook elements provided on the end of disposal conduit 21 so that a firm attachment and a leak-proof attachment is provided. The pressurized water supply is under control of valve 16 by means of manually operated knob 26, while the shut-off valve 14 is manually under control of handle 27. This latter valve is considered a slide or gate valve for totally or partially interrupting the fluid communication between the first pipe component 11 and the second pipe component 12. This valve 14 shuts off communication when the valve 16 is open so that the flush or rinse water will only enter outlet 20 to the internal plumbing system of the vehicle. When the valve 16 is in its "closed-off" condition, the valve 14 is opened to permit gravity to dispose of the rinse water leaving a cleansed tank 18 in the vehicle.

Figure 3:
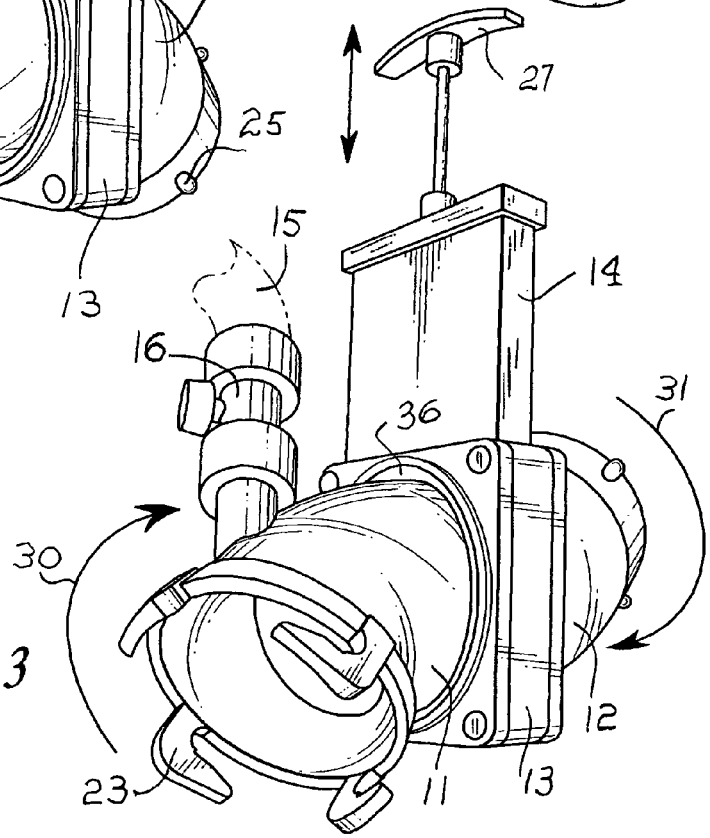
FIG. 3 is a view, similar to the view of FIG. 2, illustrating rotational pipe components for aligning the assemblage with the vehicle outlet and the sewage conduit disposal.

Referring now in detail to FIG. 3, it can be seen that the first and second pipe components rotate relative to the body 13 in the direction of arrows 30 and 31. The rotation of the pipe components is important for alignment purposes since the vehicle needs to be in close proximity to the end of disposal conduit 21 in order to be properly coupled to outlet 20.

Referring now in detail to FIG. 4, a fully assembled flush valve and draining assemblage is illustrated in which the holding tank 18 includes an outlet comprising pipe 20 and coupler 29 which is joined to the attachment means on the first pipe component 11 by means of interconnecting the hook element 23 with the pins 28 on the coupler 29. The opposite end of the assemblage detachably connects with disposal conduit 21 by means of a similar connecting means having element 33 which hook about pins, such as pin 25, on the end of the second pipe component. It can be seen that the body 13 mounts the flush valve 14 so that a slide or blade 34 moves vertically in the body in the direction of arrow 35. It can also be seen that the body includes a pair of end plates 36 and 37 and that each of the respective pipe components 11 and 12 include a circular flange 38 which bears against a circular O-ring 40. One side of each O-ring is captured in a groove in the body 13 while the opposite side of the O-ring bears against the flange 38. When screws, such as screw 41, are tightened, pressure is exerted against the O-ring to provide proper sealing. However, the frictional engagement between the flange 38 and the O-ring is such as to permit rotation of the pipe sections 11 and 12 as needed in order to provide the aforementioned alignment.

If desired, the outlet pipe component 12 may be eliminated with the pins 25 being incorporated into the valve body so that the hooks 33 can be directly detachably connected with the body. Clarity of the flush can be reviewed through the transparent inlet pipe component 11.

In actual practice, the flush valve and drain assemblage of the present invention provides the user with an easy and effective way to clean-out one or both of the vehicle holding tanks. First the flush and drain assemblage is connected to the sewage hose 21 followed by attaching the opposite end to the plumbing outlet 20 of the vehicle. A water hose 15 is attached to the valve 16. One should always use a different hose from the hose normally used for drinking water, and it is recommended that a gray hose be employed so as to avoid confusion. Next, the user opens the dump valve (not shown) and the valve 14 so that anything in the holding tank will be evacuated under gravitational force until the tank is empty. At such time, valve 14 is closed and valve 16 is turned on so that the holding tank is filled with flush water. The water fills the tank at about eight to ten gallons per minute which is of sufficient flow to create eddies and turbulence to pull all material left on the sides of the holding tank into the clean, flush water. When the holding tank is three-quarters full, the valve 16 is turned off so as to cease introduction of pressurized water and then valve 14 is open. There is enough water to move all the solids out of the tank and down the disposal drain conduit 21. If the water coming out of the tank is not clear as visible through the clear pipe components 11 and 12, the above procedures can be repeated. Experience has indicated that up to three rinses may be necessary to properly clean a holding tank.

Therefore, a user may clean one or both tanks with one connection at a time and in one place with no mess or fuss and no need to take a hose into the recreational vehicle interior, either through the bathroom window or in the door and across the carpet.

Both pipe component 11 and 12 may be employed or only one at the selection of the user. The pipe components are elbow joints and rotate 360 degrees for convenient hook-up installation. Rotation of the pipe components or barrels allows greater flexibility for the user with the various tightly configured holding tank drain valves and plumbing.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A flush and drain assemblage comprising:
   a flush valve body having opposite sides separated by a movable gate;
   an inlet pipe component rotatable coupled to a first side of said flush valve body;
   a source of drain fluid detachably coupled to said inlet pipe component;
   said inlet pipe component composed of a transparent material permitting visual observation of drain fluid introduced to said flush valve body;
   said inlet pipe component being an elbow joint of 45-degree shape adapted to rotate 360 degrees with respect to said flush valve body;
   a circular flange carried on an end of said inlet pipe component; and
   said flush valve body having a removable end plate including a circular groove rotatably occupied by said circular flange.

2. The flush and drain assemblage defined in claim 1 wherein:
   a drain coupler having a plurality of pins outwardly projecting; and
   said inlet pipe component includes an attachment means for detachably coupling with said pins of said drain coupler.

3. The flush and drain assemblage defined in claim 2 wherein:
   said attachment means is a plurality of hooks with each hook having a notch for retaining a selected one of said pins.

4. The flush and drain assemblage defined in claim 3 including:
   an O-ring seal disposed in said circular groove permitting rotation of said circular flange while preventing leakage of drain fluid.

5. The flush and drain assemblage defined in claim 3 including:
   an outlet pipe component rotatably carried on a second side of said flush valve body; and
   said outlet pipe component being an elbow joint composed a transparent material allowing visual observation of drain fluid existing from said flush valve body.

6. A drainage system to be interfaced with a recreational vehicle to permit the contents of a holding tank from said vehicle to be emptied via a drainpipe, said drainage system comprising:
   a hollow drain valve body defining a drainage flow path communicating with the holding tank and through which fluid contents of said tank passes;
   flow control means operable in said drain valve body to control the passage of the contents of said drain pipe through the flow path of said drain body;
   manual means to enable said flow control means to be moved to a first position in said drain valve body and across the flow path to block the passage of the fluid contents therethrough or to a second position in said drain body and out of said flow path to permit the passage of fluid tank contents therethrough;
   a fluid inlet pipe composed of a transparent material and communicating with said flow path for conducting the fluid content wherein said fluid inlet pipe is interconnected at one end with said drain valve body ahead of said flow control means and loser to the recreational vehicle than said flow control means, said fluid inlet pipe supplying fluid to said drain valve body only when said flow control means is moved to said first position across said flow path;
   said fluid inlet pipe rotatably mounted on said drain valve body and having an elbow shape;
   a rotatable mounting means interconnecting said fluid inlet pipe with said drain valve body; and
   said rotatable mounting means includes a flange carried on said fluid inlet pipe and said flange movably disposed in a groove provided in a removable end plate of said flush valve body.

7. The drainage system defined in claim 6 including:
   an O-ring seal disposed between said flange and said flush valve body preventing leakage while permitting rotation of said flange relative to said flush valve body.

8. A drainage system for detachable connection between a vehicle drain outlet and a disposal conduit comprising:
   a flush valve body having a pair of removable end plates with a circular groove provided between each plate and said flush valve body;
   an inlet pipe having a circular flange disposed in one of said circular grooves and an outlet pipe having a flange disposed in the other of said circular grooves;
   said inlet pipe and said outlet pipe rotatable with respect to said flush drive body via said flange and said groove relationship;
   said inlet pipe and said outlet pipe composed of a transparent material permitting observation therethrough; and
   a sealing means disposed in each groove bearing against said flange to prevent leakage while maintaining rotational movement of said flanges.

9. The drainage system defined in claim 8 wherein:
   said inlet pipe and said outlet pipe rotate a complete 360 degrees independently of each other about said flush valve body enabling said flush valve body to operate from any position; and
   said inlet pipe and said outlet pipe allowing, flexibility of use with respect to various closely configured holding tank drain valves and plumbing.

10. The drainage system defined in claim 9 wherein:
    said inlet pipe and said outlet pipe are elbow joints.

* * * * *